Oct. 27, 1936.   R. B. DAY   2,058,958
PROCESS OF DESULPHURIZING LIGHT HYDROCARBONS

Original Filed April 29, 1931

Inventor
Roland B. Day.

By Stone, Boyden, Mack & Hahn.
Attorneys

Patented Oct. 27, 1936

2,058,958

UNITED STATES PATENT OFFICE 2,058,958

PROCESS OF DESULPHURIZING LIGHT HYDROCARBONS

Roland B. Day, Chicago, Ill., assignor to Universal Oil Products Company, Chicago, Ill., a corporation of South Dakota Application April 29, 1931, Serial No. 533,851
Renewed March 4, 1936

2 Claims. (Cl. 196—36)

This invention relates to a process for treating products of petroleum distillation or pyrogenetic decomposition, as well as natural gasolines, for the purpose of improving the same as to color, odor, doctor test, and other characteristics desirable in a commercial product.

In my copending application Serial No. 518,795, filed February 27, 1931, a process is described wherein light hydrocarbon vapors are contacted with hydochloric acid and with chlorides or oxides of metals whose sulphides are insoluble in hydrochloric acid, suspended in a non-aqueous medium.

The present invention is a modification of the invention set forth in my above-entitled copending application, in which are employed oxides of metals whose sulphides are soluble in hydrochloric acid.

In the present invention, an improvement of the petroleum distillation products as to color, odor, doctor test, and other characteristics is effected by causing a removal of sulphur and a polymerization of other undesirable constituents whereby these may be readily removed.

It has been more or less common to treat the distilled or cracked vapors from hydrocarbon oils with metallic chloride for the purpose of causing the recombination of the constituents into lighter forms. Many disadvantages have attended this type of process, however, and these disadvantages have been due, in no small degree, to the difficulty experienced in handling the metallic halide.

It has been discovered that a marked saving in time and expense can be accomplished by contacting the gasoline or other hydrocarbon fraction in vapor phase with oxides of metals whose sulphides are soluble in hydrochloric acid in suspension in a high-boiling non-aqueous medium in a suitable liquid-vapor contacting apparatus, such as a bubble-cap tower, for example, and adding a suitable amount of hydrochloric acid to the inflowing hydrocarbons.

This invention consists broadly in contacting with oxide of a metal whose sulphide is soluble in hydrochloric acid, a light hydrocarbon fraction, such as gasoline, and hydrochloric acid. Air or oxygen may also be added at a suitable point before or after entry of the hydrocarbon vapors into the contacting apparatus, as it is found that the oxygen exerts a beneficial effect in retarding the formation of undesirable sulphur compounds.

The invention may be more readily understood if reference is had to the accompanying drawing, in which.

Figure 1:
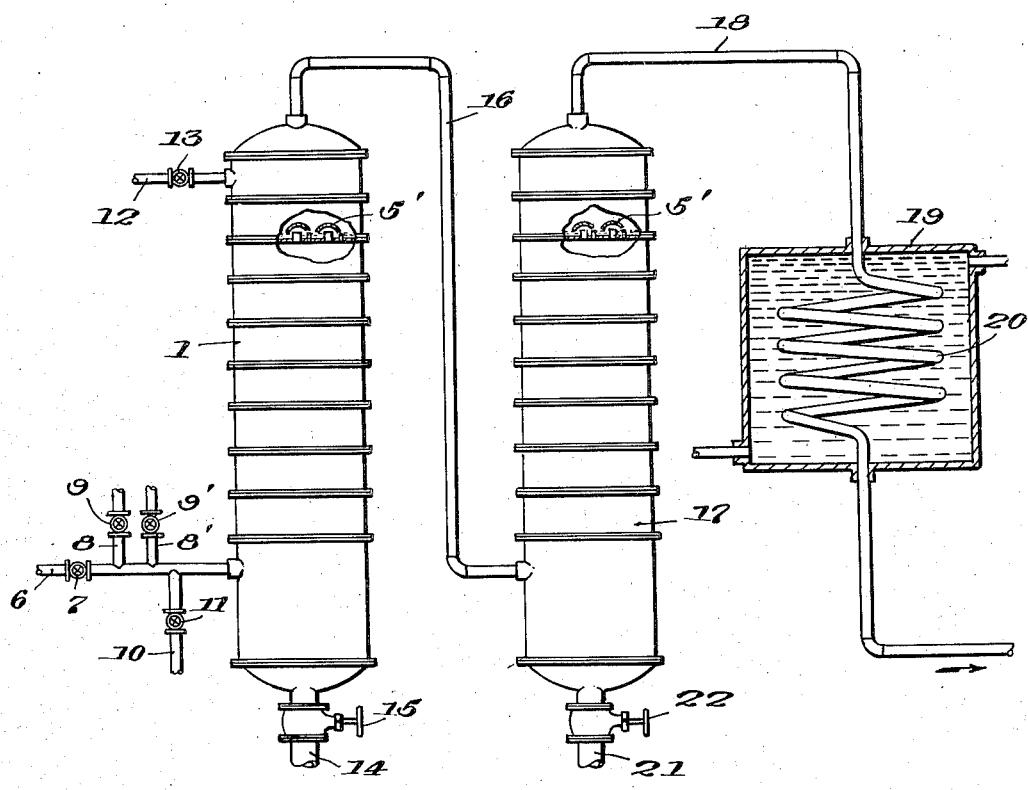
Figure 1 represents diagrammatically an apparatus in which the present invention may be carried out.
Figure 2:
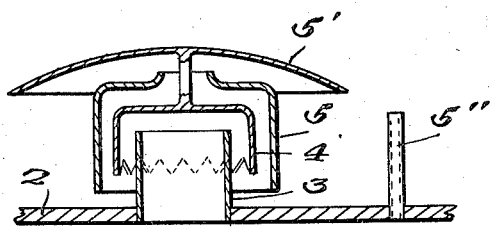
Figure 2 represents an enlarged view of one of the bubble-caps recommended for use, and indicated diagrammatically in the broken-away portion of Figure 1.

Referring to the drawing 1 represents a treating unit of the bubble-cap tower type, the bubble-caps being preferably of the type shown and described in my copending application, Serial No. 394,763, filed September 24, 1929. This type of bubble-cap tower is illustrated in Figure 2, in which 2 represents a horizontal bubble tray having a plurality of openings therein, each opening having its wall formed annularly as a single piece 3, extending upwardly as a pipe. 4 is a primary baffle covering the mouth of pipe 3 and spaced therefrom and having a downwardly flanged lower portion and a serrated lower edge. 5 represents a second baffle adjacent to its flanged portion and curved upwardly near its upper lip or edge, and 5' represents a cap for preventing splashing around the upper edge of the annular baffle. This construction has been found to furnish an intimate vapor-liquid contact, the vapor passing downwardly under the serrated lower edge of baffle 2 where it is broken up into bubbles, the bubbles rising with liquid around interior of annular baffle 5.

6 represents an inlet pipe for gasoline or other light hydrocarbon vapors, introduced from any suitable source, such as a cracking still, for example. This pipe is provided with valve 7 and leads into treating unit 1 near the lower end thereof. Leading into pipe 6 at suitable points is branch pipe 10, for the admission of hydrochloric acid gas from any suitable source, the flow of this gas being regulated by manipulating a valve 11. 12 represents a pipe leading into the upper part of treating unit 1 for the admission of metal oxide, this pipe being provided with valve 13, and 14 represents a pipe leading from the bottom of treating unit 1 for the withdrawal of spent metal chloride, this withdrawal pipe being provided with valve 15. From the top of treating unit 1 a pipe 16 leads to the bottom of a fractionation tower 17, this second unit being similar in construction to the first treating unit, but which is really a bubble-cap fractionating apparatus for making end-point gasoline. This tower is provided with an outlet pipe 18 near the top thereof leading to condenser 19, and through condenser coil 20 to storage. An outlet pipe 21, provided with valve 22, leads from the bottom of fractionating tower 17 to conduct away heavy ends or "bottoms". Pipes 14 and 18 may be provided with valves if it is desirable or necessary. A short pipe (not shown) provided with a control valve leads into the downgoing vertical portion of pipe 18, for the introduction of ammonia.

In the operation of the improved process as carried out in accordance with the present invention, valve 13 is opened and a suspension of oxide of a metal whose sulphide is soluble in hydrochloric acid, for example, one of the oxides of zinc, aluminum, iron, chromium, magnesium, cobalt, nickel, calcium, sodium, potassium, lead, or tin, in a high boiling non-aqueous liquid, for example, a heavy lubricating oil, is admitted to treating unit 1 through pipe 12, where it builds up on the trays inside the unit and commences to overflow from one tray to the next. Valves 7, 11, and 9', in case it is desired to use air, are opened, to the required extent, and gasoline vapors, steam, and air begin to flow upwardly, and contact with the downflowing metallic compound suspension on the bubble trays. A prolonged and efficient contact is thus secured, the hydrochloric acid gas reacting with the hydrocarbon over the suspension of metallic compound as a contacting agent. The treated gasoline or other hydrocarbon vapors leaving treating unit 1 by pipe 16 pass into fractionating tower 17 where they are rectified to end-point gasoline, the bottoms being removed by pipe 21. The lighter fractions from tower 17 are conducted by pipe 18 through condenser 20 surrounded by water jacket 19, where they are condensed and the condensate conducted to storage. Ammonia may be introduced through pipe 18ᵃ to neutralize any hydrochloric acid coming over with the vapors.

It is to be understood as within the scope of this invention that the process may also be operated without using air, although air is beneficial in the treatment of metallic sulphide formed. In case air is not used, the metallic oxide used as a contacting agent may be regenerated and reused, going into the treating unit as an oxide and coming out in spent form as a sulphide which can then be settled or filtered from the heavy liquid medium and processed back to the oxide for reuse. The regenerated oxide is returned to the inlet pipe of the treating unit 1.

It is further contemplated that other reagents except air, capable of facilitating a reaction with sulphides and hydrochloric acid itself, may be introduced with the gasoline vapors and acid, in order to make the metallic sulphides dissolve. The sulphide-hydrochloric acid reaction might also be accelerated by using air outside the treating tower. The advantage of this process over the air treatment within the tower, or over processes using metal turnings as a contacting agent, are that the contacting agent may be continuously removed, bringing with it the non-aqueous medium for suspension of the oxide. The difficulty of controlling the air is further eliminated, as it is used at a remote point where it will not affect the color of the gasoline.

In practicing this invention, zinc oxide has been found to be a very satisfactory reagent, but the use of any of the other oxides of metals, such as those mentioned above, whose sulphides are soluble in hydrochloric acid, is contemplated as being within the scope of this invention.

I claim:

1. A process for refining hydrocarbon distillate which comprises passing vapors thereof with hydrogen chloride countercurrent to a hydrocarbon liquid of higher boiling point than said distillate and carrying in suspension an oxide of a metal whose sulphide is soluble in hydrochlorc acid.

2. A process for refining hydrocarbon distillate which comprises passing vapors thereof with hydrogen chloride through a hydrocarbon liquid of higher boiling point than said distillate and carrying in suspension an oxide of a metal whose sulphide is soluble in hydrochloric acid.

ROLAND B. DAY.